United States Patent [19]

Ngo

[11] Patent Number: 4,949,217
[45] Date of Patent: Aug. 14, 1990

[54] MULTILAYER CAPACITOR SUITABLE FOR SUBSTRATE INTEGRATION AND MULTIMEGAHERTZ FILTERING

[75] Inventor: Khai D. T. Ngo, Gainesville, Fla.

[73] Assignee: General Electric Company, Schenectady, N.Y.

[21] Appl. No.: 370,517

[22] Filed: Jun. 23, 1989

[51] Int. Cl.⁵ .......................... H01G 4/38; H01G 7/00
[52] U.S. Cl. ..................................... 361/328; 29/25.42
[58] Field of Search ........................ 361/320, 328, 321; 29/25.42

[56] References Cited

U.S. PATENT DOCUMENTS

| | | | |
|---|---|---|---|
| 3,130,356 | 4/1964 | Weller | 361/321 X |
| 4,419,714 | 12/1983 | Locke | 361/321 |
| 4,800,459 | 1/1989 | Takagi et al. | 361/321 |

OTHER PUBLICATIONS

Prymak, J. D., "Software for Calculating Power Capability for MLC Ceramic Capacitors", *Fourth International High Frequency Power Conversion 1989 Conference*, May 1989 Proceedings, pp. 167–174.

Maxwell, J. and Doty, M., "Processing Guidelines for S.M.P.S. Multilayer Ceramic Capacitors", *Fourth International High Frequency Power Conversion 1989 Conference*, May 1989 Proceedings, pp. 175–180.

*Primary Examiner*—Donald A. Griffin
*Attorney, Agent, or Firm*—Marvin Snyder; James C. Davis, Jr.

[57] ABSTRACT

A multilayer capacitor comprises stacked, spaced-apart electrodes of sheet form, dielectric layers between the electrodes, and first and second groups of spaced-apart conductive vias extending transversely of the sheet-form electrodes and through aligned holes in the dielectric layers. Alternate electrodes are instantaneously positive, and the remaining electrodes are instantaneously negative. Each via of the first group is electrically connected to the positive electrodes and passes insulatingly through the negative electrodes. Similarly, each via of the second group is electrically connected to the negative electrodes and passes insulatingly through the positive electrodes. Each via has, in the plane of the electrodes, a cross-sectional form in the shape of an elongated rib of greater length than width. The elongated ribs of the first group are disposed in a first plurality of rows with their lengths in spaced-apart, aligned relationship, and the ribs of the second group are disposed in a second plurality of rows with their lengths in spaced-apart, aligned relationship. The first plurality of rows is disposed substantially orthogonally with respect to the second plurality of rows.

21 Claims, 3 Drawing Sheets

4,949,217

MULTILAYER CAPACITOR SUITABLE FOR SUBSTRATE INTEGRATION AND MULTIMEGAHERTZ FILTERING

This invention was made with Government support under Contract No. N66001-87-C-0378 awarded by the Department of the Navy. The Government has certain rights in this invention.

This invention relates to a multilayer capacitor that is amenable to substrate integration and is suitable for use in multimegahertz filtering. The invention is especially, though not exclusively, concerned with a multilayer capacitor of this type that has a relatively large capacitance, e.g., several tens of microfarads.

BACKGROUND

When it is desired to incorporate a large amount of capacitance into an integrated circuit, a multilayer capacitor is usually provided. If this capacitor is of the usual design, it will be considerably taller than the associated semiconductor components, which results in undesirably low packaging density. To realize a higher packaging density, the capacitor should be made low profiled and be integrated into the substrate of the circuit. For achieving a large capacitance with a low profiled capacitor, it is necessary that the capacitor have a large footprint (i.e., area occupied on the substrate). For example, for a capacitance of 50μF, a footprint of 1.5 inches by 1.5 inches might typically be required.

In a multilayer capacitor having conventional electrode and termination geometries, the terminations are disposed at opposite edges of the electrodes, as may be seen in soon-to-be-described FIGS. 1 and 2 of this application, where the electrodes are shown at 12 and the terminations at 24 and 26. If the illustrated electrode and termination geometries are used in a capacitor with a large footprint, the capacitor will have relatively high equivalent series inductance and a low self-resonant frequency (for example, less than 500 kHz for 50μF).

OBJECTS

An object of this invention is to provide a low-profiled multilayer capacitor having a large capacitance that has a relatively high self-resonant frequency, e.g., at least several megahertz.

Another object is to provide a capacitor having the characteristics set forth in the immediately-preceding object and further having a relatively low equivalent series resistance (ESR) and a relatively low equivalent series inductance (ESL).

Still another object is to provide a multilayer capacitor having its electrodes and terminations constructed so that the positive and negative terminations are close together and can remain close together independent of increases in the capacitance value of the capacitor.

Still another object is to provide a capacitor design that allows for increases in the capacitance value without requiring an increase in spacing between the positive and negative terminations of the capacitor.

SUMMARY

In carrying out the invention in one form, there is provided a multilayer capacitor comprising a plurality of stacked spaced-apart electrodes, each in the form of a thin conductive sheet, with alternate sheets at a given instant being positive electrodes and the remaining sheets being negative electrodes. A plurality of dielectric layers are respectively interposed between adjacent electrodes. Extending transversely with respect to the sheets are first and second groups of spaced-apart conductive vias, individual vias extending through aligned holes in the dielectric layers. Each via of the first group is electrically connected to the positive electrodes and passes through holes in the negative electrodes without making electrical contact with the negative electrodes. Similarly, each via of the second group is electrically connected to the negative electrodes and passes through holes in the positive electrodes without making contact with the positive electrodes.

Each of the vias, as viewed in transverse cross-sectional form in planes where it passes through the dielectric layers, assumes the shape of an elongated rib that is much greater in length than in width. The elongated ribs of the first group are disposed in a first plurality of rows wherein the ribs have their lengths disposed in spaced-apart, substantially aligned relationship. The elongated ribs of the second group are disposed in a second plurality of rows wherein the ribs have their lengths disposed in spaced-apart, substantially aligned relationship. The first plurality of rows is disposed substantially orthogonally with respect to the second plurality of rows.

This capacitor is especially suited for energy-storage and filtering in high density (e.g., 100 watts per cubic inch) power supplies switched at a rate of several megahertz.

BRIEF DESCRIPTION OF FIGURES

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF EMBODIMENT

Figure 1:
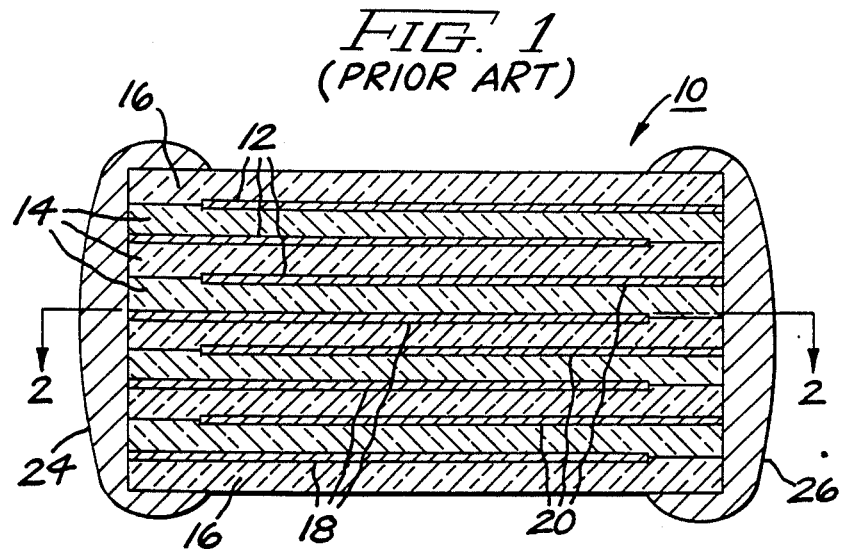
FIG. 1 is a sectional view through a conventional multilayer capacitor.
Figure 2:
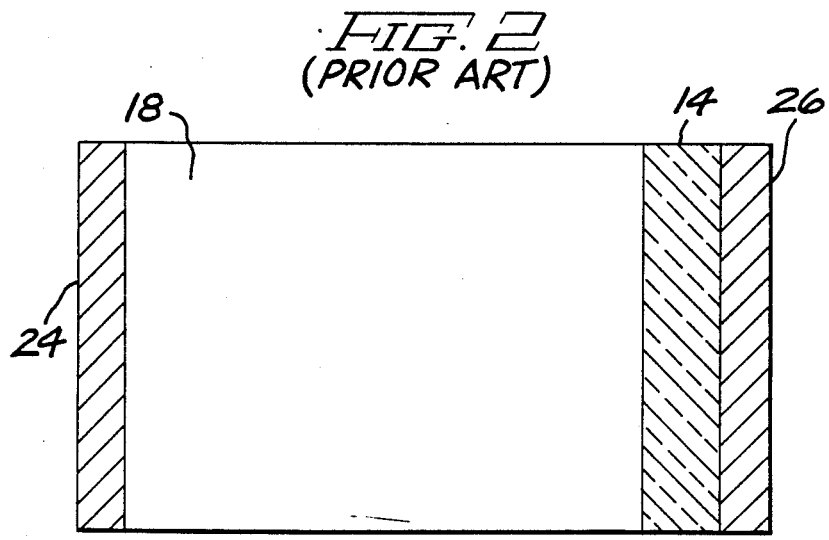
FIG. 2 is a sectional view taken along line 2—2 of the capacitor of FIG. 1.

The prior art multilayer capacitor 10 of FIGS. 1 and 2 comprises a stack of rectangular metal sheets 12, adjacent ones of which are separated by rectangular layers of dielectric material 14. In addition, end layers 16 of dielectric material are disposed at opposite ends of the stack. For convenience, alternating ones of the metal sheets 12 are referred to herein as positive electrodes 18 of the capacitor; and the remaining metal sheets 20, which interleave with the positive electrodes, are referred to as negative electrodes of the capacitor. It will, of course, be understood that in an a-c circuit, these polarities will typically alternate at the frequency of the a-c voltage.

The positive electrodes 18 are electrically connected in parallel by a first termination 24 which is joined, at the left hand edge of the capacitor, to all of sheets 18. Similarly, the negative electrodes 20 are electrically connected in parallel by a second termination 26 which is joined, at the right hand edge of the capacitor, to all of sheets 20. The resulting geometry is a rectangular block with positive and negative terminations on two opposite faces of the block.

The capacitance value of the capacitor of FIGS. 1 and 2 can be increased by increasing the area of each of the electrodes (i.e., increasing the footprint of the capacitor) or by increasing the number of electrodes present by increasing the stack height. Both of these approaches result in the capacitor having a higher equivalent series inductance (ESL) and a lower self-resonant frequency, which are often undesirable.

The following provides a more specific example of this problem. Tests of multilayer capacitors of the type illustrated in FIGS. 1 and 2 have indicated that the self-resonant frequency of such capacitor with a capacitance below 1$\mu$F was above 5 MHz. As the capacitance was increased toward 50$\mu$F by either of the approaches of the preceding paragraph, the self-resonant frequency was lowered to below 500 kHz as the capacitor dimension(s) were increased. If the electrode area was increased by increasing the distance between terminations 24 and 26, this longer distance led to higher ESL and lower self-resonant frequency. On the other hand, if the capacitance was increased by increasing the number of layers, the length of each termination increased, and this resulted in a higher ESL and lower self-resonant frequency.

As pointed out hereinabove, one of the objectives of this invention is to provide a multilayer capacitor design in which the amount of capacitance present can be increased without unduly lowering the self-resonant frequency, e.g., without reducing the self-resonant frequency to below about 5 MHz. This can be accomplished with the capacitor design of FIGS. 3-5. The capacitor of FIGS. 3-5 comprises a stack of conductive sheets 30. At a given instant, alternate ones of sheets 30 constitute positive electrodes 32 and the remaining sheets constitute negative electrodes 34. The negative electrodes of sheet form interleave with the positive electrodes of sheet form. Between each pair of adjacent positive and negative electrodes is a sheet, or layer, 36 of dielectric material.

Figure 4:
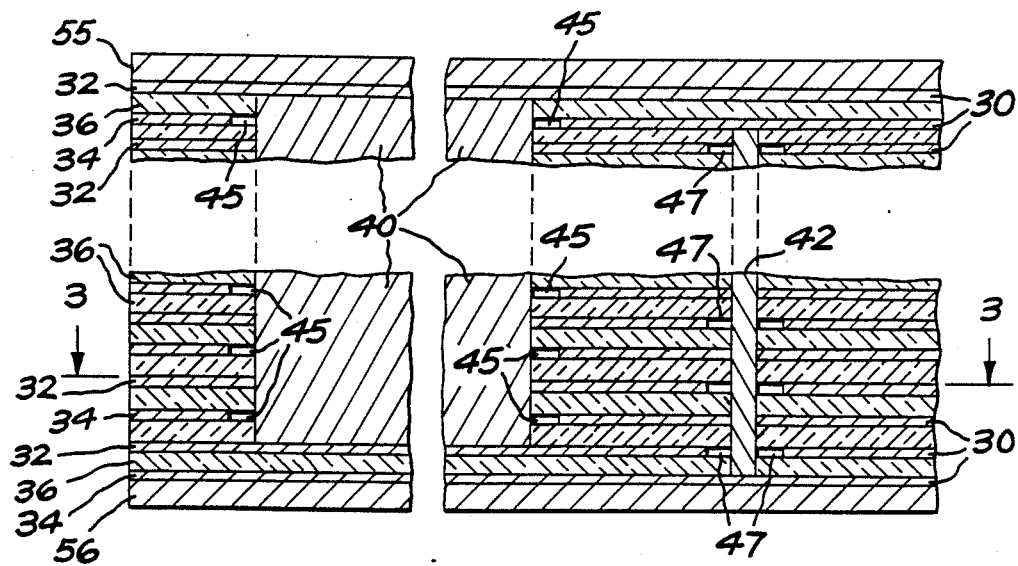
FIG. 4 is a sectional view of the capacitor depicted in FIG. 3, taken along line 4—4 of FIG. 3.f

As shown in to FIG. 4, the positive electrodes 32 are electrically interconnected by positive-electrode vias 40 of conductive material, and the negative electrodes 34 are electrically interconnected by negative electrode vias 42 of conductive material. Each positive-electrode via 40 extends through aligned openings in dielectric sheets 36 and also through aligned openings 45 in the sheets constituting negative electrodes 34. The opening 45 in each negative electrode 34 that receives a positive-electrode via 40 is sufficiently large that the positive-electrode via 40 can pass therethrough without making electrical contact with the negative electrode. Thus, in the region where positive-electrode via 40 passes through a negative-electrode 34, the upper surface of dielectric sheet 36 carrying this negative electrode is not coated with metal and acts to insulate via 40 from the surrounding inner periphery of hole 45 through negative electrode 34.

Similarly, as best seen in FIG. 4, each of the negative-electrode vias 42 extends through aligned openings in dielectric sheets 36 and also through aligned openings 47 in the sheets constituting positive electrodes 32. The opening 47 in each positive electrode 32 that receives a negative-electrode via 42 is sufficiently large that negative-electrode via 42 can pass therethrough without making electrical contact with the positive electrode. In the region where negative-electrode via 42 passes through a positive electrode 32, the upper surface of dielectric sheet 36 carrying this positive electrode 32 is not coated with metal and acts to insulate via 42 from the surrounding inner periphery of hole 47 through positive electrode 32.

Figure 3:
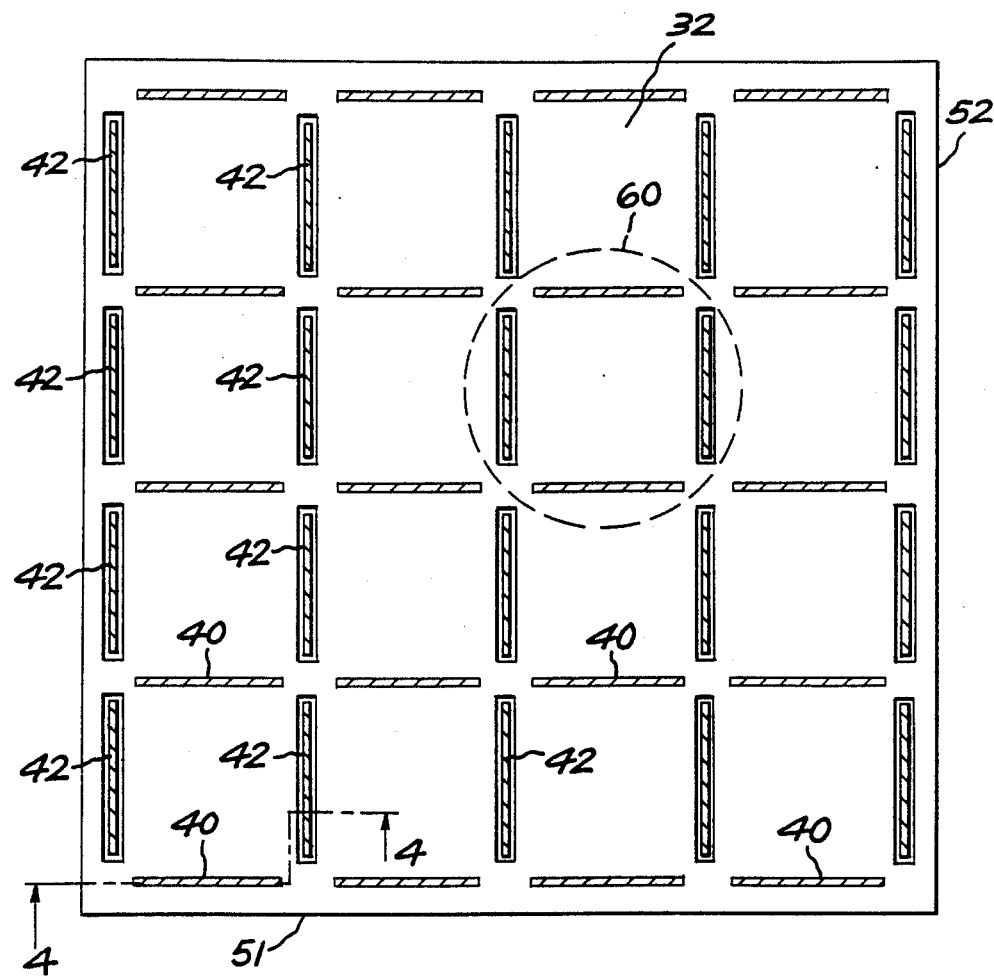
FIG. 3 is a sectional view of the multilayer capacitor of the invention, which illustrates its cellular configuration in one form of the present invention.

As best seen in FIG. 3, which is a sectional view along line 3—3 of the capacitor shown in FIG. 4, each positive electrode via 40 has a cross-sectional form, when viewed in a plane parallel to a sheet 32 forming an associated positive electrode, in the shape of an elongated rib that is much greater in length than in width. The width is limited to a few skin-depths of the conductive material at the frequency of interest. The cumulative length of all the vias should be as large as possible to achieve low ESR and ESL. Similarly, as viewed in the same plane, each of the negative-electrode vias 42, in cross-sectional view, is shaped in the form of an elongated rib that is much greater in length than in width. Each positive and negative via exhibits this same elongated rib form where it passes through a dielectric sheet 36.

As shown in FIG. 3, the elongated positive-electrode vias, or ribs, 40 are disposed in a first plurality of rows, each row extending from a point near the left-hand edge of the capacitor to a point near the right-hand edge of the capacitor. As also seen in FIG. 3, the elongated negative-electrode vias, or ribs, 42 are disposed in a second plurality of rows, each extending from a point near the bottom edge of the capacitor to a point near the top edge of the capacitor. In each of these rows, the elongated ribs therein are disposed with their lengths in substantially aligned relationship, and ribs of adjacent rows are spaced apart by a short distance.

It will be apparent from FIG. 3 that the rows containing ribs 40 are perpendicular, or orthogonal, with respect to the rows containing ribs 42. As further shown in FIG. 3, the rows containing ribs 40 cross the perpendicular rows containing ribs 42 at the locations where ribs 42 are spaced apart; and the rows containing ribs 42 cross the perpendicular rows containing ribs 40 at the locations where ribs 40 are spaced apart.

In one specific embodiment of the invention, the thickness of each of the dielectric layers is about 0.0005 inch and the electrode thickness is about 0.0001 inch. dielectric is barium titanate, and the electrodes are of silver palladium. Each of ribs 40 and 42, as viewed in FIGS. 3 and 4, is about 0.2 inches in length and is separated from an adjacent rib in its row by about 0.05 inches. The width of each rib need be no greater than two skin depths of the metal forming the via, and is preferably about 0.006 to 0.01 inch (at 2 MHz for silver palladium). The length and width dimensions of a through-hole (45 or 47 as shown in FIG. 4) in an electrode are about 0.005 inches larger than the length and width dimensions of a rib extending therethrough.

The above thicknesses of electrodes and dielectric layers are typical of those attainable with existing multilayer capacitor technology. These small thicknesses enable this capacitor typically to comprise 50 or so basic sandwich units stacked upon one another, each sandwich unit comprising a positive electrode 32, a negative electrode 34, and a dielectric layer 36 sandwiched between the electrodes. For simplicity, a much smaller number of basic sandwich units is shown in the illustrated embodiment of FIG. 4.

In contrast to the conventional geometry of FIGS. 1 and 2, which connects all electrodes to one or the other of two terminations 24 and 26 located at opposite sides of the electrodes, the geometry utilized in the embodiments of FIGS. 3 and 4 distributes the terminations 40 and 42 throughout the surface of each electrode, including all four sides of each electrode. As already noted, each termination 40 or 42 is an elongated rib, and the positive-electrode terminations 40 run parallel to one side 51 of the rectangular capacitor, while the negative-electrode terminations 42 run perpendicular to positive-electrode terminations 40 and parallel to another side 52 of the rectangular capacitor that is adjacent to side 51 thereof.

FIG. 4 shows, at the upper and lower ends of the capacitor, two conductive buses 55 and 56 which respectively engage outer electrodes 32 and 34. Through these buses current enters and leaves the capacitor. Current flowing downwardly through the capacitor enters the capacitor through upper bus 55 in a direction perpendicular to the broad upper surface of the uppermost positive electrode 32, and passes vertically through the positive-electrode vias 40, spreads horizontally along the surface of positive electrodes 32, is displaced vertically through dielectric layers 36, spreads horizontally along the surface of negative electrodes 34, flows downwardly through negative-electrode vias 42, and leaves the capacitor through lower bus 56 in a direction perpendicular to the lowermost electrode 34.

The capacitor current encounters low ESR and low ESL as it flows through the distributed terminations 40 and 42 because the terminations are of shallow depth (e.g. less than 0.05 inches, considered in the vertical direction depicted in FIG. 4) and also because the terminations have a large cross-sectional area due, primarily, to their relatively great length as depicted in FIG. 3. Moreover, each termination 40 and 42, as viewed in FIG. 3, is desirably fabricated with as great a length as possible to minimize its contribution to the ESL.

The displacement current should also encounter low ESR and ESL because each positive termination 40, except those at the top and bottom sides as viewed in FIG. 3, is immediately surrounded by four negative terminations 42 positioned orthogonally with respect to the positive termination, and each negative termination 42, except those at the left- and right-hand sides as viewed in FIG. 3, is immediately surrounded by four positive terminations 40 positioned orthogonally with respect to the negative termination.

The entire capacitor can be thought of as a parallel combination of many small cells, each of which is defined by two parallel adjacent positive terminations 40 extending through substantially the entire capacitor thickness (except the lowermost dielectric layer) and the two parallel negative terminations 42 most adjacent to both of these two positive terminations extending through substantially the entire capacitor thickness (except the uppermost dielectric layer). For illustrative purposes, one of these small cells is identified in FIG. 4 by being surrounded by a dashed line circle 60. The resonant frequency of the entire capacitor is approximately equal to that of each of these small cells. For a 0.25 inch ×0.25 inch cell having 1μF of capacitance, a self resonant frequency above 5 MHz can easily be achieved. Thus, in the embodiment of FIG. 3, where 16 such cells are connected in parallel in the manner shown in FIG. 4 so that the capacitance of the overall capacitor is approximately 16μF, a self-resonant frequency of 5 MHz or above is readily attainable. Even if the number of cells is increased, for example, to 50 or more, and provided that the termination geometry of FIG. 3 is maintained, a self-resonant frequency of 5 MHz or above can still be attained.

The capacitor of FIGS. 3 and 4 is especially suited for energy storage and filtering in high-density (e.g., 100 watts/inch$^3$) power supplies switched at a rate of several megahertz.

The capacitor of FIGS. 3 and 4 can be fabricated using conventional processes, some of which have been used for making multilayer capacitors of the type shown in FIGS. 1 and 2. For example, each ceramic layer may be made from a slurry comprising very fine particles of ceramic, a polymeric binder, and a fluidizing vehicle such as toluene. A small amount of this slurry (having a viscosity similar to that of honey) is laid down on a working surface, is passed under a blade to spread it out into a thin sheet, and is then warmed to evaporate the fluidizing vehicle, leaving a plastic-like sheet. This sheet is then perforated (for example, by punching it with a suitable die or punch) to provide openings where the vias are to be located. Then the upper surface of the sheet is screen printed with a metallic composition such as silver palladium. The screen printing leaves a very thin metallic coating over the entire upper surface except for a narrow marginal region about each opening that is to receive an opposite polarity via. The metallic composition fills all the openings in the sheet to form in each of these openings a portion of a via extending through this opening.

Figure 5:
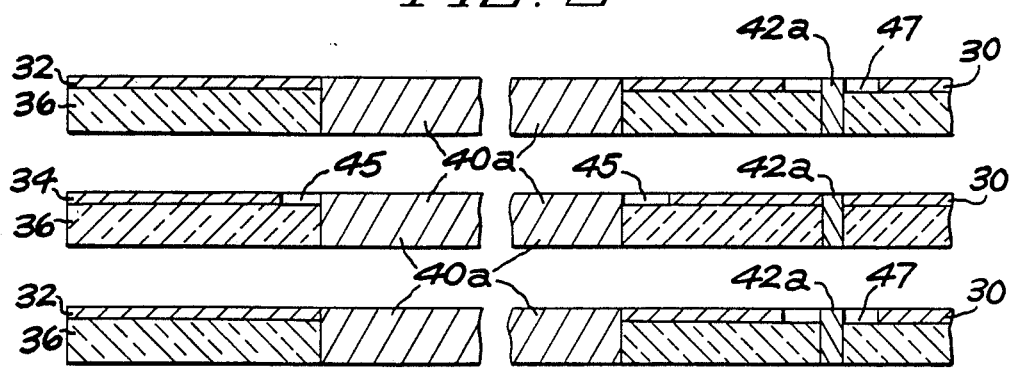
FIG. 5 is an enlarged sectional view of a capacitor such as that shown in FIG. 3, taken along a line similar to line 4—4 of FIG. 3, showing portions of several green (i.e., unfired ceramic) dielectric layers during the capacitor manufacturing process after the capacitor layers have been screen-printed to provide electrodes thereon and while the layers are being stacked.

FIG. 5 is an enlarged sectional view (taken along a line similar to line 4—4 of FIG. 3) of portions of several of these green dielectric sheets after they have been screen printed in this manner. It can be seen in this figure that each of the via portions 40a and 42a extending through a green dielectric sheet 36 extends entirely through the sheet thickness and terminates at its upper end in the same plane as the top surface of the associated metal coating 32 or 34 on the dielectric sheet.

These coated sheets are then stacked as shown in FIG. 5 with the positive electrodes 32 and the negative electrodes 34 alternating in position and the via sections 42a aligned and the via sections 40a aligned. After the desired number of sheets has been stacked, the resulting stack is suitably pressed to assure good contact between the sheets, particularly between the aligned via sections of adjacent layers. This assures that each via 40 and 42 is a continuous conductor along its length. Then the stack is fired in a furnace to convert the green dielectric material into a hard ceramic. Such firing burns off the polymeric binder in the green dielectric material, sintering together the ceramic particles and converting each dielectric sheet into a dense mass.

It will be apparent that the layers of FIG. 5 are of two different designs. One design has a negative electrode 34 on its upper face and includes via sections 40a insulated from the electrode and via sections 42a electrically connected to the electrode. The other design has a positive electrode 32 on its upper face and includes via sections 40a electrically connected to the electrode and via sections 42a insulated from the electrode. Although not apparent from FIG. 4, the uppermost electrode 32 of the capacitor is made considerably thicker than the other electrodes 32 so as to make it more rugged and thus more readily joinable to the bus 55 without being damaged by the joining process. The lowermost ceramic sheet 36 includes a relatively thick coating on its lower face to facilitate joining to lower bus 56. It is noted that the uppermost ceramic sheet 36 includes imperforate regions in alignment with negative-electrode vias 42 to insulate these vias from the positive bus; and, similarly, the lowermost ceramic sheet 36 includes imperforate regions in alignment with the positive-electrode vias 40 to insulate these vias from negative bus 56.

It is to be understood that in referring to the buses as positive and negative, reference is being made only to their instantaneous polarity inasmuch as this capacitor is intended for alternating current applications. Similarly, the reference to the electrodes and vias as positive or negative is with regard to the instantaneous polarity of these components.

While FIG. 4 shows adjacent dielectric layers spaced slightly apart in regions 45 and 47 where each via is surrounded by electrode material of opposite polarity, it is to be understood that the dielectric layers can touch in these regions, in effect, locating ceramic electrical insulation in these regions. In either case, the desired objective of insulating the vias from the opposite polarity electrode material is attained.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed as new and desired to be secured by Letters Patent of the United States is:

1. A multilayer capacitor comprising:
   a stack of sheet electrodes and dielectric layers arranges alternately such that each respective sheet surface of each of said dielectric layers is in contact with a sheet electrode, respectively; and
   first and second groups of spaced-apart conductive vias extending through aligned holes in said dielectric layers and said sheet electrodes;
   said first group of conductive vias being in electrical contact with alternate ones of said sheet electrodes in said stack and being insulated from the remaining ones of said sheet electrodes, and said second group of conductive bias being in electrical contact with said remaining ones of said sheet electrodes and being insulated from said alternate ones of said sheet electrodes, each of said vias having, in the plane of said electrodes, a cross-sectional form in the shape of an elongated rib having a greater length than width, said vias of said first group arranged in a first plurality of rows of multiple vias in spaced-apart, aligned relationship and said vias of said second group arranged in a second plurality of rows of multiple vias in spaced-apart, aligned relationship;
   said first plurality of rows extending transversely with respect to said second plurality of rows.

2. The multilayer capacitor of claim 1 in which said first plurality of rows is disposed substantially orthogonally with respect to said second plurality of rows.

3. The multilayer capacitor of claim 1 wherein the rows of said first plurality are parallel to each other and wherein the rows of said second plurality are parallel to each other.

4. The multilayer capacitor of claim 3 in which said first plurality of rows is disposed substantially orthogonally with respect to said second plurality of rows.

5. The multilayer capacitor of claim 1 in which the rows of said second plurality intersect the rows of said first plurality at points located between the ribs in said first plurality.

6. The multilayer capacitor of claim 5 wherein the rows of said first plurality are parallel to each other and wherein the rows of said second plurality are parallel to each other.

7. The multilayer capacitor of claim 5 in which the rows of said first plurality intersect the rows of said second plurality at points located between the ribs in said second plurality.

8. The multilayer capacitor of claim 7 wherein the rows of said first plurality are parallel to each other and wherein the rows of said second plurality are parallel to each other.

9. The multilayer capacitor of claim 1 in which:
   (a) each via of said first group is insulated from said negative electrodes by termination of the negative electrodes on an associated dielectric layer so that said electrodes terminate in spaced relationship to each of the holes in the associated dielectric layer through which the vias of said first group pass; and
   (b) each via of said second group is insulated from said positive electrodes by termination of the positive electrodes on an associated dielectric layer so that said electrodes terminate in spaced relationship to each of the holes in the associated dielectric layer through which the vias of said second group pass.

10. A multilayer capacitor comprising:
   (a) a plurality of stacked spaced-apart electrodes, each in the form of a thin conductive sheet, alternate sheets at a given instant being positive electrodes and the sheets juxtaposed with respect to said alternate sheets being negative electrodes at said instant;
   (b) plurality of dielectric layers respectively interposed between adjacent electrodes and electrically insulating juxtaposed positive and negative electrodes from each other; and
   (c) first and second groups of spaced-apart conductive vias, individual ones of which extend transversely with respect to said conductive sheets and through aligned holes in said dielectric layers, each of said vias in the rib that is greater in length than in width, each via of said first group being electrically connected to said positive electrodes and passing through holes in said negative electrodes without making electrical contact with said negative electrodes, and each via of said second group being electrically connected to said negative electrodes and passing through holes in said positive electrodes without making electrical contact with said positive electrodes;
   (d) the vias of said first group being disposed in a first plurality of rows such that the vias in each row of said first plurality are disposed with their lengths in spaced-apart, substantially-aligned relationship;
   (e) the vias of said second group being disposed in a second plurality of rows such that the vias in each row of said second plurality are disposed with their lengths in spaced-apart, substantially aligned relationship;

(f) said first plurality of rows extending transversely with respect to said second plurality of rows.

11. The multilayer capacitor of claim 10 in which said first plurality of rows is disposed substantially orthogonally with respect to said second plurality of rows.

12. The multilayer capacitor of claim 10 wherein the rows of said first plurality are parallel to each other and wherein the rows of said second plurality are parallel to each other.

13. The multilayer capacitor of claim 12 in which said first plurality of rows is disposed substantially orthogonally with respect to said second plurality of rows.

14. The multilayer capacitor of claim 10 in which the rows of said second plurality intersect the rows of said first plurality at points located between the ribs in said first plurality.

15. The multilayer capacitor of claim 14 wherein the rows of said first plurality are parallel to each other and wherein the rows of said second plurality are parallel to each other.

16. The multilayer capacitor of claim 14 in which the rows of said first plurality intersect the rows of said second plurality at points located between the ribs in said second plurality.

17. The multilayer capacitor of claim 16 wherein the rows of said first plurality are parallel to each other and wherein the rows of said secondary plurality are parallel to each other.

18. The multilayer capacitor of claim 10 in which:

(a) each of said dielectric layers comprises a sheet of dielectric material; and
(b) the electrode adjacent one face of each of said dielectric layers comprises a thin layer of metal coated on said one face.

19. The multilayer capacitor of claim 18 in which said sheets of dielectric material are arranged in a stack, each individual sheet of dielectric material, respectively, having said metallic coating on said one face and having its opposite face abutting the thin layer of metal coated on said one face of an adjacent sheet of dielectric material.

20. The multilayer capacitor of claim 10 in which each via of said first group is insulated from said negative electrodes by terminating the negative electrodes on an associated dielectric layer so that said electrodes terminate in spaced relationship to each of the holes in the associated dielectric layer through which the vias of said first group pass.

21. The multilayer capacitor of claim 10 in which:

(a) each via of said first group is insulated from said negative electrodes by terminating the negative electrodes on an associated dielectric layer so that said electrodes terminate in spaced relationship to each of the holes in the associated dielectric layer through which the vias of said first group pass; and
(b) each via of said second group is insulated from said positive electrodes by terminating the positive electrodes on an associated dielectric layer so that said electrodes terminate in spaced relationship to each of the holes in the associated dielectric layer through which the vias of said second group pass.

* * * * *